(No Model.)
E. MATHER.
SAND TRAP AND BUTTON CATCHER FOR THE MANUFACTURE OF PAPER.
No. 246,528.  Patented Aug. 30, 1881.
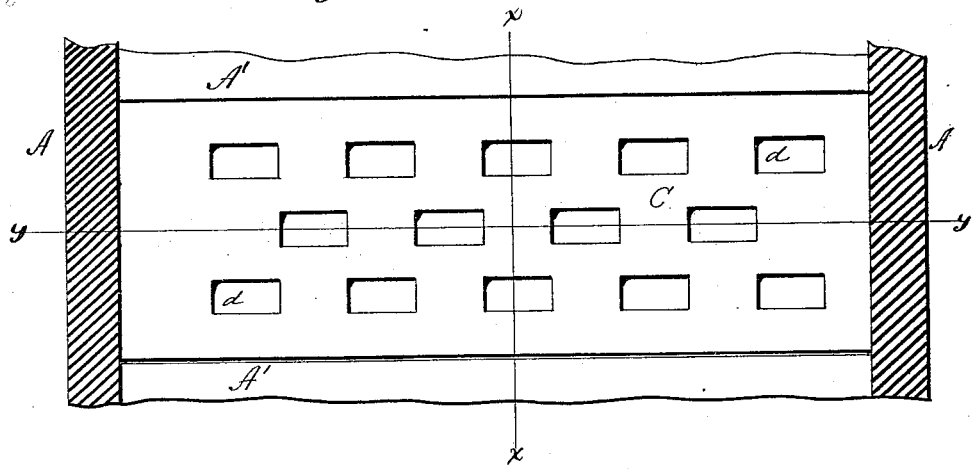
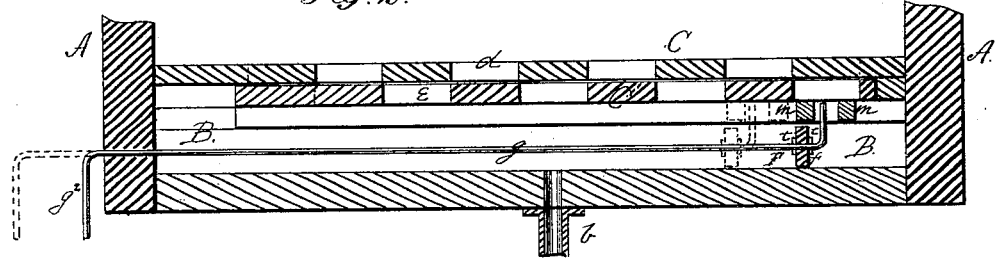
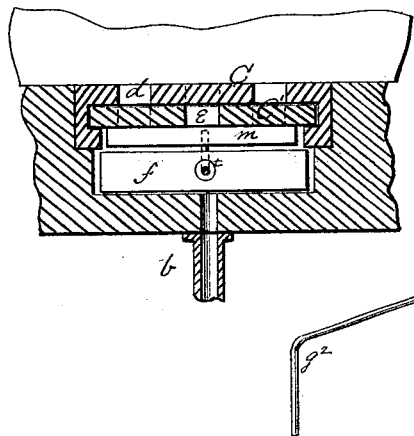
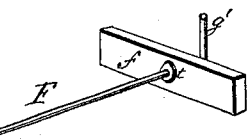
Attest,
W. H. H. Knight
Fred. M. Ott
Inventor.
Edmund Mather,
By Hill & Dixon.
His Attys in Fact.

UNITED STATES PATENT OFFICE.

EDMUND MATHER, OF HARRISBURG, PENNSYLVANIA.

SAND-TRAP AND BUTTON-CATCHER FOR THE MANUFACTURE OF PAPER.

SPECIFICATION forming part of Letters Patent No. 246,528, dated August 30, 1881.

Application filed July 27, 1881. (No model.)

*To all whom it may concern:*

Be it known that I, EDMUND MATHER, of Harrisburg, in the county of Dauphin and State of Pennsylvania, have invented a new and useful Sand-Trap and Button-Catcher for the Manufacture of Paper; and I do hereby declare that the following is a full, clear, and exact description of the said invention, which will enable others skilled in the art to which it pertains to make and use the same, reference being had to the accompanying drawings, in which—

Figure 1 is a sectional top-plan view; Fig. 2, a longitudinal vertical section; Fig. 3, a vertical cross-section, and Fig. 4 a perspective view of the rake detached.

Similar letters of reference indicate the same parts.

The object of the invention is, first, to prevent loss of the fiber with the sand, dirt, and other waste materials, and, secondly, to facilitate and expedite the cleaning of the trap and the discharge of the waste therefrom.

Heretofore sand-traps have been provided with a removable perforated or grated cover, through which the sand, buttons, hooks and eyes, and other foreign substances passed into the trap-box beneath. The sand, buttons, &c., would wash into the trap in a short time, after which the cover, remaining open, would permit a considerable quantity of fiber to pass into the trap, which would be discharged with the other waste and lost.

The first feature of my invention is for the purpose of remedying this difficulty; and it consists in a sand-trap having a cover the holes of which can be closed at will without stopping the engine, so that when the sand, buttons, &c., have been washed out the cover may be closed to prevent any further waste of the paper-stock.

There has also heretofore been great difficulty and inconvenience, and often delay, in discharging the sand and other waste from the trap, in consequence of the fact that it was necessary to remove the cover in order to get access to the interior of the box.

The second feature of my invention is for the purpose of obviating this defect; and it consists in providing the sand-box with a rake the handle of which projects through the side of the engine, by which means the sand and other waste can be stirred and agitated at will without interfering with the running of the engine.

Referring to the drawings, A A represent the walls of the engine, A' the bottom or floor of the engine, and B the box of the sand-trap, from which the waste is discharged in the usual manner by a pipe, $b$, all of these parts being of any approved form and construction.

The trap-cover consists of two plates, C C', having corresponding series of vertical openings, $d$ $e$, and capable of being moved so that the openings shall register with each other, and thus open the passages down into the trap, or break joints, and thus close said passages. I prefer to construct the cover with an immovable upper plate, C, and a longitudinally-sliding lower plate, C', running in suitable guides and operated by a rod or handle extending out through the wall of the engine; but the form or construction is not material so long as the substantial result is obtained.

The rake is shown at F, and consists of a scraper or agitating device, $f$, of any suitable size and shape, having a handle or rod, $g$, extending out through the wall of the engine, where it can be conveniently grasped for the purpose of operating it. It is only necessary to draw it back and forth at any time to stir up the sediment in the box and cause it to flow away freely through the discharge-pipe $b$.

In order to simplify the apparatus I prefer to use one and the same handle for operating both the cover and the rake. To this end I fasten two cleats, $m$ $m$, across the under side of the movable slide C' at such distance apart that the end of the rod or handle can readily engage between them. I then extend the inner end of the handle through the rake or scraper and turn it up at substantially a right angle, as shown at $g'$. Suitable collars, $t$, on each side of the scraper hold the latter in place on the rod, but allow the rod to turn in its bearing. The outer end of the rod is preferably bent, as shown at $g^2$, in order that the workman may, by its inclination, at any time see whether the hooked end $g'$ is engaged with the slide C' or not.

With this device, when the workman wishes to open or close the register-slide, he brings the handle to the proper position (indicated, if preferred, by a scratch or mark on its outer end) and turns the rod until the hook $g'$ engages between the cleats $m\ m$, when he slides the rod longitudinally as far as it will go. When he desires to rake the trap he turns the rod till the hook $g'$ is disengaged from the cleats, and then simply thrusts it back and forth till the free discharge from the trap is assured. Separate handles may be used for the slide and rake, if preferred, and the construction of all the parts may be greatly modified, the only essentials being to have an agitator in the trap-box which can be worked by a handle from outside, and to have a cover provided with openings which can be opened and closed at will from outside.

Having thus described my invention, I claim as new—

1. The sand-trap having an adjustable cover capable of being closed or opened at will, substantially as described.

2. The rake provided with a handle extending out through the wall of the engine.

3. The reversible handle $g$, capable of operating both slide and rake, or one alone, substantially as described.

4. The combination of a cleaning-rake with the sand-trap of a pulp-washing engine, substantially as described.

5. The combination of a cleaning-rake with the sand-trap and with a register-cover capable of being opened and closed at will, substantially as described.

EDMUND MATHER.

Witnesses:
FRED. M. OTT,
M. CHURCH.